US007193676B2

(12) United States Patent
Sasaki

(10) Patent No.: US 7,193,676 B2
(45) Date of Patent: Mar. 20, 2007

(54) LIQUID CRYSTAL DISPLAY DEVICE WITH DUMMY SEGMENT ELECTRODES AND DUMMY COMMON ELECTRODES

(75) Inventor: Nobuyuki Sasaki, Chiba (JP)

(73) Assignee: Seiko Instruments Inc. (JP)

( * ) Notice: Subject to any disclaimer, the term of this patent is extended or adjusted under 35 U.S.C. 154(b) by 172 days.

(21) Appl. No.: 10/663,301

(22) Filed: Sep. 16, 2003

(65) Prior Publication Data

US 2004/0085282 A1 May 6, 2004

(30) Foreign Application Priority Data

Oct. 1, 2002 (JP) ............................ 2002-288416

(51) Int. Cl.
*G02F 1/1343* (2006.01)

(52) U.S. Cl. ........................ 349/143; 349/33; 349/139; 349/142; 349/149; 345/103

(58) Field of Classification Search ..................... None
See application file for complete search history.

(56) References Cited

U.S. PATENT DOCUMENTS 5,519,521 A * 5/1996 Okimoto et al. .............. 349/42
5,838,411 A * 11/1998 Hayakawa et al. ......... 349/139

* cited by examiner

*Primary Examiner*—Andrew Schechter
*Assistant Examiner*—Richard H Kim
(74) *Attorney, Agent, or Firm*—Adams & Wilks

(57) ABSTRACT

A liquid crystal display device has a liquid crystal panel comprised of a liquid crystal material disposed between segment and common electrodes defining pixels arranged in a matrix. A driver integrated circuit generates driving segment signals and driving common signals to drive preselected ones of the segment and common electrodes, respectively, to display an image on the liquid crystal panel. The driver integrated circuit also generates a segment signal waveform and a common signal waveform to drive one of the segment electrodes and one of the common electrodes, respectively, each placed in a normally ON state and not corresponding to the preselected ones of the segment and common electrodes, respectively, so that a frame is displayed at a portion of the liquid crystal panel not corresponding to the pixels.

5 Claims, 2 Drawing Sheets

LIQUID CRYSTAL DISPLAY DEVICE WITH DUMMY SEGMENT ELECTRODES AND DUMMY COMMON ELECTRODES

BACKGROUND OF THE INVENTION

1. Field of the Invention

The present invention relates to a driving device for liquid crystal display panel of a passive drive system and to a liquid crystal display device and an electronic device employing the same.

2. Background Information

A passive-drive liquid crystal display panel widely used in electronic devices has a structure wherein a liquid crystal layer is sealed between a transparent plate formed with a plurality of line-shaped common electrodes and a transparent counter plate formed with a plurality of line-shaped segment electrodes. Individual intersections of the common electrodes and the segment electrodes define individual pixels which constitute a display screen. That is, the display screen of m×n pixels is essentially composed of m segment electrodes and n common electrodes. ON/OFF control of each pixel is accomplished by way of a signal (driving signal waveform) applied to the segment electrode and the common electrode. Such a liquid crystal display device has a problem that an observer cannot instantaneously determine whether a pixel is OFF because it is located outside a display screen or because an OFF signal is inputted thereto. In other words, a boundary between the display screen and a non-display area is unrecognizable for the observer unless an outermost portion of the display screen (displayable area) is illuminated. For example, a commonly used color liquid crystal panel is black in an OFF state (with no voltage applied). Therefore, when a photo or game graphic with a black background is displayed on such a panel, the outermost portion of the display screen (display area) is unrecognizable. This may lead to a demand for a so-called frame display wherein outermost edges of the display screen are constantly illuminated. On the other hand, the current cellular phones or portable information terminals are generally limited in the number of display pixels in order to expedite the display of information provided via network services or by add-on applications. As to the portable information terminal, for instance, the number of display pixels depends upon an OS used therein. Normally, the OS does not give considerations to the frame display. Hence, the following method is commonly used to provide the frame display outside the display screen of m×n pixels based on the conventional passive-drive system. That is, additional pixels for frame display are provided outside the display screen so that (m+2)×(n+2) pixels in total are arranged. A graph-plotting capability is used to draw a frame while a primary display image is written to a window (display screen of m×n pixels) inside the frame. Specifically, SSD1780, a conventional liquid crystal driver commercially available from SOLOMON Systech Limited is capable of writing frame data on a respective line on vertically and laterally opposite sides externally of the display screen by utilizing a 2D graph-plotting capability of a display controller, which is called 2D graphic Limitation Graphic Acceleration (refer to, for example, non-patent document 1). However, commonly used liquid crystal drivers and controllers are not equipped with such a capability so that liquid crystal panels adapted for the frame display based on this method are limited. In addition, there is another problem that the IC having such a capability is more expensive than the common ICs. [Non-patent Document 1] The specification of the liquid crystal driver SSD1780 commercially available from SOLOMON Systech Limited (SSD1780-0.15 Full Version Specification, P42, Item93.1–93.6) retrieved on Sep. 26, 2002 via internet service (URL http://www.solomon-systech.com/products/product_lists.htm).

As described above, the attempt to provide the frame display outside the display screen can be accomplished only when the specific controller or driver is used. This imposes restriction on the specification of the liquid crystal display device. In addition, a significant cost must be borne in order to utilize the IC having such a capability.

In view of the foregoing, it is an object of the invention to permit any controller or driver to provide the frame display outside the display screen in an easy and less-costly manner without increasing the scale of the driving circuit.

SUMMARY OF THE INVENTION

According to the present invention, which is directed to the solution to the above problems, a liquid crystal display device has an arrangement wherein dummy segment electrodes and dummy common electrodes are disposed at marginal areas around a display screen including a group of segment electrodes and a group of common electrodes, and wherein the dummy segment electrodes are applied with a segment signal waveform exceeding a selection voltage of any common signal for liquid crystal selection and the dummy common electrodes are applied with a common signal waveform exceeding a selection voltage of any segment signal waveform for liquid crystal selection, whereby a frame is displayed outside the display screen.

In another aspect, the dummy electrodes are applied with a waveform which is synthesized with a driving waveform applied to the segment electrode group to provide a synthesized waveform having an effective value higher than an effective value of a waveform applied to a turned-ON liquid crystal in the display screen.

It is noted here that the waveform applied to the dummy segment electrodes or the dummy common electrodes is not formed based on a signal outputted from the driver IC just as in the conventional image display process, but is rather formed based on a signal inputted to the driver IC.

The waveform applied to the dummy common electrodes is asynchronous to an FLM signal, has an equal H·L time in one period, and does not coincide with an M signal.

As a specific example of the waveform applied to the dummy common electrodes, there may be used a signal waveform obtained by dividing down the M signal for level shift to the same potential as that of a segment voltage.

As another example of the above waveform, there may be used a signal waveform obtained by dividing down the M signal to ½.

In another aspect of the invention, the waveform applied to the dummy segment electrodes is defined to be a signal waveform having the same period as the M signal and the same potential as the waveform applied to the dummy common electrodes.

In this manner, the waveforms applied to the segment electrodes and common electrodes responsible for the frame display can be formed based on the input signal to the driver IC. This permits any type of controller or driver to provide the frame display outside the display screen in an easy and less-costly manner without increasing the scale of the driving circuit.

DETAILED DESCRIPTION OF THE PREFERRED EMBODIMENTS

Figure 1:
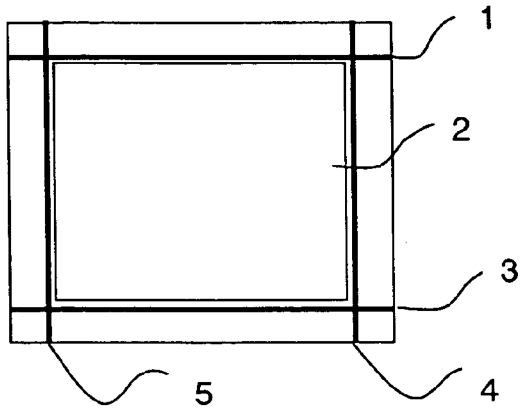
FIG. 1 is a diagram schematically showing a wiring pattern of a display screen of a liquid crystal display panel used in a liquid crystal display device of the invention.

A liquid crystal display device according to the invention includes a liquid crystal panel, and a driver IC for driving the liquid crystal panel wherein a liquid crystal layer is interposed between a transparent plate provided with a group of segment electrodes and a transparent counter plate provided with a group of common electrodes and a transparent counter plate provided with a group of common electrodes. The driver IC applies a respective signal (driving signal waveform) to a segment electrode and a common electrode constituting a pixel to be driven for normal image display, whereas the IC driver applies a frame-display common signal and a frame-display segment signal to a common electrode and a segment electrode to be driven for frame display, respectively. Specifically, the frame-display common signal has a such a waveform as to exceed a selection voltage of any segment signal waveform for liquid crystal selection, whereas the frame-display segment signal has such a waveform as to exceed a selection voltage of any common signal for liquid crystal selection. Thus a frame display on a display screen (lines in a normally-ON state are present) is accomplished.

A segment electrode (line) to be placed in th ON state is applied with the same waveform as that representative of segment selection data (All-ON data) used in a normal display drive. A common waveform for normal display drive is applied to a group of common electrodes intersecting with the segment electrode and hence, all the pixels constituted by the segment electrode are applied with a voltage of an effective value equivalent to white display data. Thus a vertical frame line is displayed on the screen.

A common electrode (line) to be placed in the ON state is applied with such a frame-display common waveform as to permit the application of a voltage exceeding the voltage for liquid crystal selection irrespective of display data (waveform) applied to segment electrodes intersecting with the common electrode. Thus, all the pixels constituted by the common electrode are applied with a voltage higher than an effective value for liquid crystal display so that a horizontal frame line is displayed on the screen. The frame-display common waveform may be any one that is asynchronous to an FLM signal, has an equal H·L time in one period, and does not coincide with an M signal. The frame-display common waveform is defined as the above for the following reason. Where a waveform synchronous to the FLM signal or coinciding with the M signal is used as the frame-display common signal, an image displayed based on segment display data will detrimentally appear to be a common electrode to be placed in the normally-ON state. A usable frame-display common waveform may be exemplified by a signal waveform which is obtained by dividing down the M signal for level shift to the same potential as that of a segment voltage.

On the other hand, a waveform applied to a segment electrode to be placed in the ON state may have the same period as the M signal and the same potential as the waveform applied to a common electrode to be placed in the ON state.

In this manner, the waveform applied to the common electrode or the segment electrode to be placed in the normally-ON state can be generated based on the input signal to the driver IC and the potential for driving the liquid crystal panel. Therefore, the object of the invention can be achieved by merely adding a simple circuit without increasing the scale of the liquid crystal driver circuit.

(Embodiment)

FIG. 1 schematically shows a construction of a display screen (wiring pattern) of a liquid crystal display device according to an embodiment of the invention. As shown in FIG. 1, a display screen 2 of a liquid crystal panel is essentially composed of m×n pixels. In a screen portion, in segment electrode wirings formed on a transparent plate and n common electrode wirings formed on a transparent counter plate intersect with one another to define the pixels. The segment electrode wirings and the common electrode wirings are applied with a liquid crystal control signal (driving signal) for image display form unillustrated segment driver IC and common driver IC, respectively. Dummy segment driver IC, respectively. Dummy segment wirings 4, 5 are laid on laterally opposite sides externally of the aforesaid m×n pixels (display screen 2). Dummy common wirings 1, 3 are also laid on vertically opposite sides externally of the m×n pixels. The dummy segment wirings 4, 5 are applied with a signal waveform exceeding a selection voltage of any common signal for liquid crystal selection, whereas the dummy common wirings 1, 3 are applied with a common signal waveform exceeding a selection voltage of any segment signal waveform for liquid crystal selection. Thus is effected the display of a frame outside the display screen. The common signal (dummy common signal) applied to the dummy common wirings has a waveform which is asynchronous to a frame line marker signal (hereafter "FLM" signal), has an equal H·L time in one period, and does not coincide with a liquid crystal AC-field generating signal (hereinafter "M signal"). For example, a usable dummy common signal may have a signal waveform obtained by dividing down the M signal for level shift to the same potential as that of a segment voltage. In this manner, the dummy common signal may be generated based on the input signal to the driver IC and the potential for driving the liquid crystal panel. Thus, the frame display can be accomplished by merely adding a simple circuit without increasing the scale of the liquid crystal driver circuit.

Figure 2:
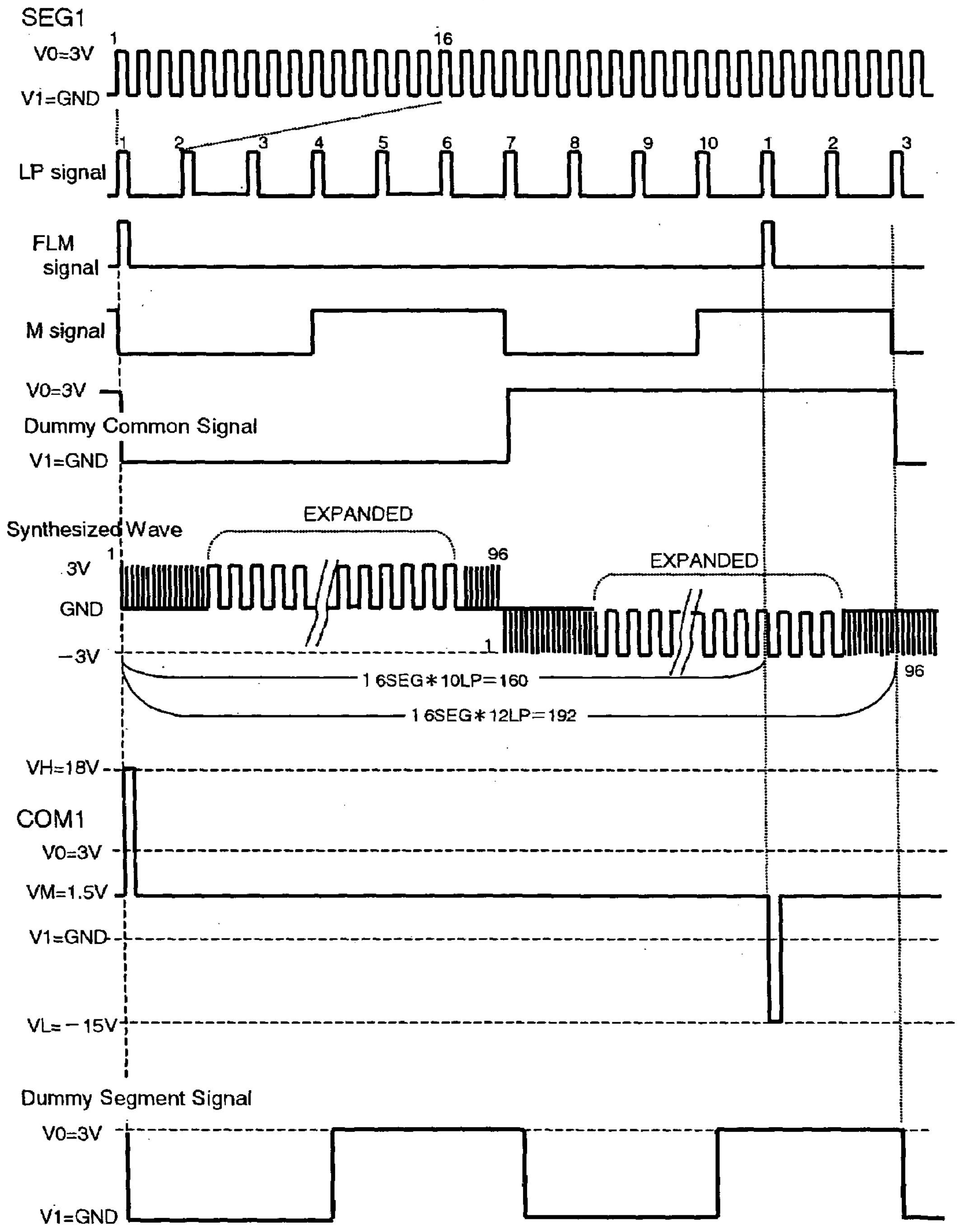
FIG. 2 is a chart showing specific examples of signal waveforms used in the liquid crystal display device of the invention.

Next, how the liquid crystal panel of the embodiment is driven will be described with reference to FIG. 2. FIG. 2 shows exemplary waveforms of driving waveforms applicable to the embodiment of the invention. A normal display screen displays an image based on a signal supplied to the segment electrodes and a signal supplied to the common electrodes. The figure illustrates waveforms of a segment signal SEG1 and of a common signal COM1 as typical examples of the driving signals. A driving method using such signals is known as the APT driving scheme (Alt & Pleshko Technique, Scanning Limitation Liquid Crystal Displays, IEEE Trans Electronic DEV ED-21.146–155 (1974)). The waveforms shown in FIG. 2 are used for driving a liquid crystal panel including a display screen of 160 pixels (segment lines: 16, common lines: 10) at a Duty of 1/10 and a bias of 1/12. In this case, display data providing a checkered pattern display on the screen are applied to the segment electrodes and common electrodes. The other driving conditions are set as follows: VO=3.0V, VM=1.5V, V1=GND, VH=18V, VL=−15V. It is noted here that the FLM signal is indicative of a period of the display screen. The M signal is for generating an AC field in the liquid crystal or for driving to ensure that no DC component remains in the liquid crystal panel. As shown in FIG. 2, the embodiment uses, as the M signal, a signal obtained by dividing down an LP signal to ⅓. The FLM signal, LP signal and M signal described here are inputted to the segment driver IC or the common driver IC.

Next, the dummy segment signal is for driving the dummy segment wirings 4, 5. The COM1 represents an example of a waveform inputted to the common electrode wirings responsible for image display. That is, the COM1 is an example of the waveform outputted from the common driver IC. White frame portions on the laterally opposite sides of the display screen (dummy segment wiring areas) provide display based on the same principles as those of the typical APT driving scheme. These areas are applied with the M signal, a voltage amplitude of which is adjusted for level shift to the same potential as that of a segment voltage VO applied in the APT drive. That is, the same waveform as a driving waveform applied in the APT drive for turning ON all the pixels of a certain segment (switching to white display) is generated in a separate circuit and applied to the dummy segments. This waveform is synthesized with a common waveform applied in the APT drive such that a voltage of an effective value equivalent to ON display data may be applied to dots defined at intersections of the dummy segment wirings. As a result, the portions of the dummy segment wirings can be constantly placed in the ON display state irrespective of the driving waveform applied to the common side in the APT drive.

Next, the dummy common signal is for driving the dummy common wirings 1, 3. The SEG1 represents an example of a waveform inputted to the segment electrode wirings responsible for image display, or an example of the waveform outputted from a segment driver circuit IC6. A synthesized waveform is synthesized from the SEG1 and a dummy common signal. It is noted here that the dummy common signal is obtained by dividing down the liquid-crystal AC-field generating signal (M signal) to ½ for level shift to the same potential as the segment voltage VO for the APT drive, thus ensuring that a voltage exceeding the selection voltage for liquid crystal is applied to the dummy common wirings irrespective of the display data. The segment electrode wirings intersecting with the dummy common wirings are applied with the waveform for APT drive while all the pixels constituted by the dummy common wirings are applied with a voltage exceeding the effective value for liquid crystal. Therefore, all the pixels constituted by the dummy common wirings are placed in the ON display state. In this manner, ON display lines are displayed on vertically opposite sides of the display screen.

Specific description is made on how display is effected based on these waveforms. The data indicative of the checkered pattern display assume the waveform such as of the SEG1 during the APT drive. The dummy common wirings are applied with the dummy common waveform obtained by dividing down the M signal to ½ for level shift to the potential of the segment driving waveform. The white-frame display portions on the vertically opposite sides of the display screen are applied with the waveform synthesized from these two waveforms. An effective value of the synthesized waveform may be calculated using the following equation 1:

$$Vrms = \sqrt{\frac{1}{T}\int_0^T V\ (t)^2\,dt}$$

Next, the value of the synthesized wave and the effective value during the APT drive are compared using this equation. First, the effective value during the APT drive is calculated from a value of the COM1 providing All-ON display. The equation is as follows:

$$\sqrt{\frac{(16.5\text{ V})^2\times 1+(1.5\text{ V})^2\times 159}{160}}=2.0\text{ V}$$

Solving the equation gives an effective value of 2.0V.

Next, an effective value for the dummy common portion is calculated using the following equation:

$$\sqrt{\frac{(3\text{ V})^2\times 96+(0\text{ V})^2\times 96}{192}}=2.1\text{ V}$$

Solving the equation gives an effective value of 2.1V which is somewhat higher than the effective value in the APT drive. Thus, the dummy common wiring portions are constantly placed in the ON display state because they are applied with a little higher voltage than that for All-ON display in the APT drive.

In a case where the SEG1 data indicates a display based on a 1-dot ON/2-dot OFF pattern, an effective value for the dummy common wirings is calculated based on the following equation:

$$\sqrt{\frac{(3\text{ V})^2\times 48+(0\text{ V})^2\times 48}{96}}=2.1\text{ V}$$

Solving the equation gives an effective value of 2.1V.

Thus, the effective value for the dummy common portion is greater than 2.0V and hence, the dummy common portion can be placed in the white display state irrespective of the display data applied to the segment.

Figure 3:
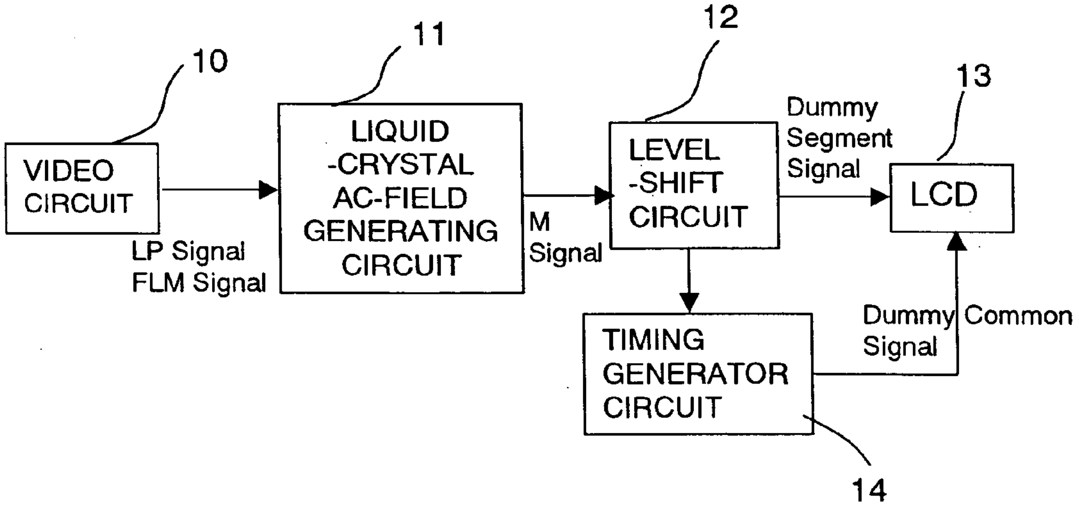
FIG. 3 is a block diagram showing an example of circuits for generating a waveform of a dummy segment signal or of dummy common signal according to the invention.

FIG. 3 is a block diagram showing an example of circuit blocks for generating the aforesaid dummy segment signal and dummy common signal. A VIDEO circuit 10 is a controller generating a variety of signals for driving the liquid crystal display panel. The signal LP (line pulse) or FLM signal (frame pulse) outputted from the VIDEO circuit is inputted to a liquid-crystal AC-field generating circuit 11 which divides down the input signal thereby generating the liquid-crystal AC-field generating signal (Msignal). The dividing value is determined taking the display quality of the liquid crystal panel into consideration and is normally a prime number. The M signal is committed to a level shift circuit 12 for shifting an amplitude level of the signal to that of the segment voltage for APT drive. The level-shifted signal, as the dummy segment signal, is supplied to the dummy segment wirings of a liquid crystal panel 13. The level-shifted signal is also divided down to ½ by a timing generator circuit 14 so that the resultant signal, as the dummy common signal, is supplied to the dummy common wirings of the liquid crystal panel 13.

In a case where the liquid crystal panel is a color display panel in which the dummy segment wiring portions are provided with color filters R, B and G similarly to the arrangement of the display screen, three dummy segment wirings corresponding to the respective colors may be laid outside of the display screen and may be applied with the aforesaid dummy segment signal whereby a white frame can be displayed outside the color display screen. The three lines may be shorted at place spaced away from the display screen. The dummy segment wirings corresponding to the tri-color filters may be unified into a single thick wire. On the other hand, a frame of a specific color can be displayed by applying the aforesaid dummy segment signal to any one of the three dummy segment wirings while placing the other dummy segment wirings in the OFF state. The dummy common wirings are laid in a manner that a single line is extended in a similar way to the arrangement of the display screen and at respective places above and below the display screen. The dummy common wirings are applied with the dummy common signal. Thus, the invention is applicable to both the monochromatic and the color liquid crystal display device of the passive drive system.

As described above, the liquid crystal display device according to the invention is adapted to apply the waveform to the common electrodes to be driven for the frame display, the waveform exceeding the selection voltage of any segment signal waveform for liquid crystal selection, and to apply the waveform to the segment electrodes to be driven for the frame display, the waveform exceeding the selection voltage of any common signal for liquid crystal selection. This permits the frame to be displayed without causing any interference with the conventional APT drive (passive drive).

Furthermore, the waveform applied to the common electrodes to be constantly placed in the ON state is generated based on the input signal to the driver IC and the potential for driving the liquid crystal panel. Hence, the invention can be readily implemented at low cost without increasing the scale of the circuit.

The width of the frame can be readily adjusted by changing the number or width of an ITO wiring defining each dummy portion.

Thus the present invention provides an easy and low-cost frame display outside the display screen of the passive drive system without being restricted by the specification of the liquid crystal controller or the driver. Accordingly, the invention contributes to enhanced qualities of consumer products such as cameras, cellular phones and watches in the field of the electronic where the liquid crystal display devices are widely used.

What is claimed is:

1. A liquid crystal display device comprising: a first transparent plate having a plurality of segment electrodes for receiving driving segment signals and a dummy segment electrode; a second transparent plate having a plurality of common electrodes for receiving driving common signals and a dummy common electrode, the second transparent plate being spaced-apart from and opposite to the first transparent plate to define a gap therebetween; and a liquid crystal layer disposed in the gap between the first and second transparent electrodes; wherein the plurality of segment and common electrodes define a plurality of pixels arranged in a matrix for displaying an image, the dummy segment electrode is disposed outside of the segment electrodes defining the pixels for displaying an image, and the dummy common electrode is disposed outside of the common electrodes defining the pixels for displaying an image; wherein the dummy segment electrode receives a dummy segment signal waveform so that an effective voltage value between the dummy segment signal waveform and any waveform of the driving common signals exceeds a selection voltage applied across the liquid crystal layer, and the dummy common electrode receives a dummy common signal waveform so that an effective voltage value between the dummy common signal waveform and any waveform of the driving segment signals exceeds the selection voltage applied across the liquid crystal layer, whereby dots formed by the dummy segment electrode and the common electrodes and dots formed by the dummy common electrode and the segment electrodes are placed in a normally ON state.

2. A liquid crystal display device according to claim 1; wherein the dummy common signal waveform is asynchronous to a frame line marker signal, has an equal H·L time in one period, and does not coincide with a liquid-crystal AC-field generating signal.

3. A liquid crystal display device according to claim 2; wherein the dummy common signal waveform is obtained by dividing down the liquid-crystal AC-field generating signal for level shift to the same potential as that of a segment voltage.

4. A liquid crystal display device according to claim 2; wherein the dummy common signal waveform is a signal waveform obtained by dividing down the liquid-crystal AC-field generating signal to ½.

5. A liquid crystal display device according to claim 1; wherein the dummy segment signal waveform has the same period as a liquid-crystal AC-field generating signal and the same potential as the waveform applied to the dummy common electrode.

* * * * *